(12) United States Patent
Noruschat et al.

(10) Patent No.: US 12,723,635 B2
(45) Date of Patent: Sep. 1, 2026

(54) VIBRATION DAMPER FOR A VEHICLE

(71) Applicants: thyssenkrupp Bilstein GmbH, Ennepetal (DE); thyssenkrupp AG, Essen (DE)

(72) Inventors: Tim Noruschat, Wuppertal (DE); Nicolas Sumkoetter, Wadersloh (DE); Klaus Schmidt, Odenthal (DE)

(73) Assignees: thyssenkrupp Bilstein GmbH, Ennepetal (DE); thyssenkrupp AG, Essen (DE)

( * ) Notice: Subject to any disclaimer, the term of this patent is extended or adjusted under 35 U.S.C. 154(b) by 296 days.

(21) Appl. No.: 18/232,029

(22) Filed: Aug. 9, 2023

(65) Prior Publication Data

US 2024/0052906 A1 Feb. 15, 2024

(30) Foreign Application Priority Data

Aug. 10, 2022 (DE) ..................... 10 2022 208 321.0

(51) Int. Cl.
*F16F 9/18* (2006.01)
*B60G 13/08* (2006.01)
(Continued)

(52) U.S. Cl.
CPC .............. *F16F 9/18* (2013.01); *F16F 9/3257* (2013.01); *B60G 13/08* (2013.01); *F16F 2222/12* (2013.01); *F16F 2230/0041* (2013.01)

(58) Field of Classification Search
CPC .......... F16F 9/18; F16F 9/3257; F16F 9/3271; F16F 9/34; F16F 9/3207; F16F 9/3214;
(Continued)

(56) References Cited

U.S. PATENT DOCUMENTS 3,302,756 A * 2/1967 Mcintyre .............. F16F 9/3415 188/315
3,329,241 A * 7/1967 Palmer .................. F16F 9/3242 188/315
(Continued)

FOREIGN PATENT DOCUMENTS

CN 112824699 A 5/2021
DE 20 2021 102 351 U1 5/2021
(Continued)

OTHER PUBLICATIONS

Steger, English translation DE 102020008116 A1, Feb. 24, 2022, p. 1-6.*

*Primary Examiner* — Robert A. Siconolfi
*Assistant Examiner* — James K Hsiao
(74) *Attorney, Agent, or Firm* — thyssenkrupp North America, LLC

(57) ABSTRACT

The present disclosure relates to a vibration damper for a vehicle comprising: an external tube and an internal tube which is arranged coaxially relative thereto, wherein a compensation chamber for receiving hydraulic fluid is formed between the external tube and the internal tube, and a working piston which is connected to a piston rod and which is arranged so as to be movable back and forth inside the internal tube, wherein the internal space of the internal tube is subdivided by the working piston into a first working chamber and a second working chamber, a central tube which is arranged inside the compensation chamber and which is attached to the internal tube, wherein the central tube has a tubular element and a helical element which is connected to the tubular element.

16 Claims, 3 Drawing Sheets

(51) Int. Cl.
*B60G 17/08* (2006.01)
*F16F 9/32* (2006.01)

(58) Field of Classification Search
CPC .......... F16F 9/325; F16F 9/44; F16F 2222/12; F16F 2230/0041; B60G 13/08; B60G 17/08
See application file for complete search history.

(56) References Cited

U.S. PATENT DOCUMENTS

| | | | | |
|---|---|---|---|---|
| 3,945,474 | A * | 3/1976 | Palmer | F16K 15/148 137/854 |
| 10,704,641 | B2 * | 7/2020 | Roessle | F16F 9/50 |
| 10,968,975 | B2 * | 4/2021 | Muraguchi | F16F 9/3214 |
| 11,143,260 | B2 * | 10/2021 | Deferme | F16F 9/46 |
| 2005/0067240 | A1 * | 3/2005 | Holiviers | F16F 9/062 188/315 |
| 2009/0120749 | A1 * | 5/2009 | Kolz | F16F 9/185 188/322.19 |
| 2016/0059656 | A1 * | 3/2016 | Funke | B60G 13/08 188/267.1 |
| 2018/0172105 | A1 * | 6/2018 | Roessle | F16F 15/005 |
| 2019/0186581 | A1 * | 6/2019 | Roessle | F16F 9/062 |
| 2019/0368568 | A1 | 12/2019 | Muraguchi et al. | |
| 2020/0208704 | A1 * | 7/2020 | Deferme | F16F 9/325 |
| 2020/0208705 | A1 * | 7/2020 | Deferme | B60G 13/08 |
| 2021/0148430 | A1 * | 5/2021 | Reimann | F16F 9/364 |
| 2023/0392664 | A1 * | 12/2023 | Schwarz | F16F 9/3235 |
| 2024/0200632 | A1 * | 6/2024 | Noruschat | F16F 9/185 |

FOREIGN PATENT DOCUMENTS

| | | |
|---|---|---|
| DE | 11 2019 006 471 T5 | 9/2021 |
| DE | 10 2020 008 116 A1 | 2/2022 |

* cited by examiner 26
32
64
48
44b
44a
46
56a
56e
30
28

26
32
44b
46
44a
68
56f
56b
30
28

26
32
44b
64
48
44a
46
68
56b
56a
30
28
30
28

VIBRATION DAMPER FOR A VEHICLE

CROSS REFERENCE TO RELATED APPLICATION

This application is a U.S. Non-Provisional that claims priority to German Patent Application No. DE 10 2022 208 321.0, filed Aug. 10, 2022, and the entire content of which is incorporated herein by reference.

FIELD

The disclosure generally relates to vibration damper for a vehicle having a helical element.

BACKGROUND

Particularly in vibration dampers which are in the form of multi-tube vibration dampers, it is known to use helical elements. Multi-tube vibration dampers generally do not have any separate gas chamber so that the hydraulic oil and the gas are not hermetically separated from each other. Piston rod movements or accelerations of the hydraulic fluid within the vibration damper lead to relatively powerful fluctuations of the hydraulic oil level.

This often leads to a "bursting" of the hydraulic oil column so that the hydraulic oil and the gas become mixed by a foaming action in such a manner that gas reaches one of the working chambers. In such a case, the function of the vibration damper is very limited and the required damping characteristic is no longer achieved.

It is known from the prior art to use a helical element in order to calm the hydraulic oil. For example, a vibration damper with a helical element is known from DE 11 2019 006 471 T5. However, a problem is the assembly of the helical element inside the vibration damper.

Thus a need exists to provide a vibration damper which has a helical element which can be mounted in a cost-effective manner and which is preferably fixed without play and has a long service-life.

BRIEF DESCRIPTION OF THE FIGURES

Further advantageous details, features and details of the disclosure will be explained in more detail in the context of the exemplary embodiments illustrated in the figures, in which.

DETAILED DESCRIPTION

Figure 1:
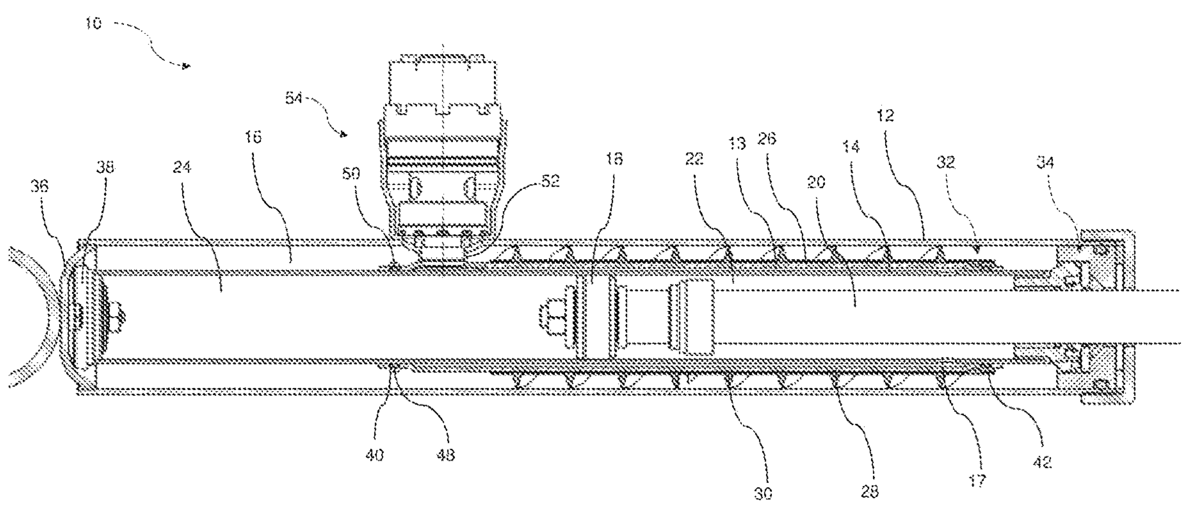
FIG. 1 shows a schematic sectional view of a vibration damper according to the disclosure.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

A vibration damper for a vehicle comprises according to a first aspect an external tube and an internal tube which is arranged coaxially relative thereto, wherein a compensation chamber for receiving hydraulic fluid is formed between the external tube and the internal tube, and a working piston which is connected to a piston rod and which is arranged so as to be movable back and forth inside the internal tube, wherein the internal space of the internal tube is subdivided by the working piston into a first working chamber and a second working chamber. The vibration damper further has a central tube which is arranged inside the compensation chamber and which is fixed to the internal tube. The central tube has a tubular element and a helical element which is connected to the tubular element.

The vibration damper is preferably a multi-tube vibration damper, wherein the compensation chamber is partially filled with a gas, in particular at the upper end. The external tube preferably at least partially forms the housing of the vibration damper. The internal face of the internal tube is preferably in the form of a guide of the working piston. The working piston preferably has a valve device, by which the first and second working chambers are connected to each other.

An annular space is preferably formed between the central tube and the internal tube. The internal tube has particularly at least one through-opening which connects the first working chamber at the piston rod side to the annular space in technical fluid terms, wherein the through-opening is formed in the first working chamber.

The vibration damper has in particular a closure assembly which is constructed and arranged in order to seal the internal space of the external tube in technical fluid terms at the piston rod side. The end of the internal tube at the piston rod side is preferably fixed to the closure assembly. The internal space of the external tube is preferably sealed in technical fluid terms by means of a base piece opposite the closure assembly at the end remote from the piston rod. There is particularly arranged on the base piece a base valve which is particularly attached to the end of the internal tube remote from the piston rod. The second working chamber is preferably connected in technical fluid terms to the compensation chamber via the base valve. The base valve is preferably a non-return valve which can be flowed through in both directions or only in one direction. For example, the base valve is in the form of a non-return valve in the pulling direction, during a piston movement in the direction out of the internal tube, and in the form of an identification generating valve in the pressing direction, during a piston movement into the internal tube.

The single central tube is preferably arranged coaxially relative to and between the internal tube and the external tube. The central tube preferably comprises the tubular element and the helical element, wherein the tubular element and the helical element are separate components which are connected to each other, preferably securely and without any play. The central tube has, for example, a length which corresponds approximately to from 40% to 90%, in particular from 50% to 80% of the length of the internal tube. The helical element is preferably arranged radially externally on the tubular element, between the tubular element and the external tube. The internal diameter of the helical element preferably corresponds to the external diameter of the tubular element so that the helical element can be pushed externally onto the tubular element. Preferably, the helical element has a tubular base member which is arranged coaxially relative to the tubular element and which lies against the external face of the tubular element with the internal face thereof.

A central tube constructed in such a manner can be produced cost-effectively and allows simple assembly which is optimised in terms of time.

According to a first embodiment, the tubular element and the helical element are connected to each other by means of a locking device. The locking device is preferably a fixed connection which prevents a relative movement of the tubular element and the helical element relative to each other at least in an axial and/or radial direction and/or in a circumferential direction. The locking device is preferably arranged at the end of the central tube at the piston rod side.

According to another embodiment, the locking device is in the form of a positive-locking connection. Preferably, the locking device is a snap-fit connection. A positive-locking connection, in particular a snap-fit connection, provides a particularly simple way of fixing the helical element on the tubular element, wherein in particular no tool is necessary.

According to another embodiment, the locking device is constructed in the helical element. The helical element preferably has the entire or at least a portion of the locking device. In particular, at least one end region of the helical element is in the form of a locking device. Preferably, the end region, which is directed in the direction of the closure assembly, of the helical element is in the form of a locking device, wherein the helical element particularly has precisely one locking device.

According to another embodiment, the locking device is constructed in such a manner that it fixes the helical element in an axial direction on the tubular element. Preferably, the locking device is constructed in such a manner that it fixes the helical element additionally in a circumferential direction on the tubular element.

According to another embodiment, the locking device comprises a plurality of clamping arms which are arranged beside each other circumferentially and which form an end of the helical element. The clamping arms are formed in such a manner, for example, that they can be deformed in a radial direction so that the cross section of the helical element is preferably increased or decreased by a deformation of the clamping arms. The deformation is preferably a reversible, resilient deformation.

According to another embodiment, the clamping arms extend in an axial direction and are spaced apart from a clamping arm which is adjacent in a circumferential direction by means of a slot. The clamping arms preferably extend parallel with each other. The helical element preferably has a plurality of axial slots which extend in an axial direction from the end, which is directed in the direction of the closure assembly, of the helical element. The slots preferably each open in a respective hole, wherein the holes are preferably arranged at the same height. In particular, the slots extend exclusively in an axial direction and do not extend in a circumferential direction. For example, at least two or more clamping arms are constructed identically.

According to another embodiment, the locking device has a first clamping arm with a first clamping arm geometry and a second clamping arm with a second clamping arm geometry. In particular, the clamping arms which are opposite at 180° are constructed identically. The locking device preferably comprises a plurality of first and second clamping arms. The clamping arms are particularly in the form of circumferential tube end portions of the helical element. The first clamping arm is, for example, in hook-like form and preferably extends in an axial direction in the direction of the end of the helical element at the closure assembly side beyond the second clamping arm. The first clamping arm particularly has a radially inwardly directed first projection which is particularly in the form of a partial ring. The projection extends in particular in a circumferential direction over the entire width of the first clamping arm and forms in particular the axial end of the first clamping arm. The second clamping arm particularly has a radially inwardly directed second projection which is preferably in the form of a partial ring and which extends in particular in a circumferential direction over the entire width of the second clamping arm. The projection is particularly arranged to be axially offset with respect to the end of the second clamping arm. The first and second projections are particularly arranged at different heights on the helical element. The first and second projections serve to position and to axially fix the helical element on the tubular element.

According to another embodiment, the central tube is attached to the internal tube via a central tube attachment. The central tube is preferably attached to the internal tube via at least one, particularly via a first and a second central tube attachment. At least one central tube attachment is arranged at the end of the central tube remote from the piston rod, wherein an additional central tube attachment is arranged, for example, at the end of the central tube at the piston rod side. Preferably, the central rod attachment is constructed in the tubular element of the central tube. The central tube attachment preferably comprises two radially internally circumferentially extending contractions, wherein in the region of the contractions the diameter of the central tube, in particular of the tubular element, is reduced so that the central tube, in particular the tubular element, lies against the internal tube. An annular expansion of the tubular element is formed between the two contractions, wherein in the region of the expansion the diameter of the tubular element is expanded to the previous diameter outside the contraction. The expansion is preferably constructed in such a manner that it forms a closed annular space between the central tube and the internal tube. There is arranged inside the annular space, for example, a sealing element, in particular a sealing ring, which lies against the internal tube and the tubular element and which forms a fluid-tight seal between them. The central tube attachment preferably constitutes a seal of the central tube, in particular of the tubular element, against the internal tube. The central tube attachment is particularly constructed in such a manner that it prevents a movement of the tubular element in a radial direction relative to the internal tube. In an axial direction, the central tube attachment preferably does not fix the tubular element to the internal tube. In particular, the central tube is fixed in an axial direction and in a circumferential direction by mounting a valve on the flange region of the central tube.

According to another embodiment, the locking device is attached to the central tube attachment. The locking device is preferably arranged on the central tube attachment at the piston rod side and forms therewith in particular a positive-locking connection. Preferably, the locking device is constructed in such a manner that it locks on the central tube attachment and preferably fixes the helical element in an axial direction on the tubular element. Preferably, the first clamping arm of the locking device is constructed in such a manner that it cooperates with the expansion, which forms the annular space, of the central tube attachment and in particular forms a positive-locking connection.

According to another embodiment, the central tube attachment comprises two radially inwardly directed, circumferentially extending contractions in the tubular element.

According to another embodiment, the first clamping arm cooperates with a contraction and the second clamping arm cooperates with an additional contraction of the central tube attachment. In particular, the projection of the first clamping arm lies against the contraction, which is external in an axial direction, of the tubular element. Preferably, the second clamping arm is constructed in such a manner that it cooperates with the additional contraction of the central tube attachment and in particular forms a positive-locking connection. In particular, the projection of the second clamping arm lies against the contraction, which is internal in an axial direction, of the central tube attachment.

According to another embodiment, the locking device is constructed in such a manner that it locks on the central tube attachment. The term "locking" is intended to be understood to be a radial reversible deformation of at least one clamping arm in a radial direction outwardly, which is followed by a radial reversible deformation of at least one clamping arm in a radial direction inwardly, wherein the helical element is fixed in an axial direction. During the assembly of the helical element, it is preferably pushed from the end, at the closure assembly side, of the tubular element onto the tubular element until it locks on the central tube attachment.

According to another embodiment, the vibration damper has a damping valve device and the tubular element has a flange region for attaching the damping valve device to the central tube. The flange region forms a receiving member for the damping valve device, in particular the flange region forms a fluid inlet and/or fluid outlet of the damping valve device. In particular, the flange region connects the annular space to the damping valve device. The external tube of the vibration damper preferably has an opening which is aligned with the flange region for receiving the damping valve device so that the damping valve device is connected to the compensation chamber in technical fluid terms. The flange region is constructed, for example, integrally with the tubular element and preferably has a circular cross section. The preferably tubular flange region extends in a radial direction outwards from the central tube, in particular from the tubular element in the direction of the external tube. The helical element preferably extends from the locking device, at the piston rod side, of the tubular element as far as the flange region.

Preferably, the helical element is spaced apart in an axial direction from the flange region and in particular does not extend in an axial direction beyond the flange region. It is also conceivable that the helical element extends from the locking device, at the piston rod side, of the tubular element as far as a location beyond the flange region, wherein the end region of the helical element preferably has a groove which extends in an axial direction and in which the flange region is arranged.

According to another embodiment, the helical element of the central tube is made from a plastics material and/or the tubular element of the central tube is made from a metal.

According to another embodiment, the helical element has one or more circumferential helical winding(s) which extend(s) outwardly in a radial direction. The helical winding(s) can, for example, be selected from a group of helical winding(s), spiral coils, spiral flank(s), cylindrical spiral(s) or a combination thereof. For example, the one or more circumferential spiral winding(s) has/have a pitch angle in the range from 0.1° to 89.9°, preferably in the range from 20.0° to 45.0°, particularly preferably in the range from 25.0° to 35.0°. In the context of the present disclosure, the term "pitch angle" is intended to be understood to be the angle which is obtained by calculating the arctangent of the pitch mm/(flank diameter mm×pi).

For example, the one or more circumferential spiral winding(s) has/have a uniform, in particular a single or different pitch angle. For example, the one or more circumferential spiral winding(s) has/have a number of turns, in particular number of turns greater than 1, preferably in the range from 2 to 6, particularly preferably a number of turns of 3. In the context of the present disclosure, the term "number of turns" is intended to be understood to be the number of spiral windings which are spaced apart from each other, which are located at one height and which are offset relative to each other in a circumferential direction.

For example, the one or more circumferential spiral winding(s) extend(s) continuously, in particular run continuously and/or has/have one or more interruption(s).

For example, the opposite ends of the one or more circumferential spiral winding(s) are arranged so as to differ from each other in a radial direction. In the context of the present disclosure, for example, the term "differ from each other" may be understood to mean different from each other, diverging from each other, for example, the opposite ends of the one or more circumferential spiral winding(s) terminate(s) in a radial direction at another position, in particular the ends of the one or more circumferential spiral winding(s) are not arranged directly opposite each other.

For example, the one or more circumferential spiral winding(s) has/have a cross sectional profile which is selected from a group of a round profile, a flat profile, an acute profile, a trapezoidal profile or a combination thereof. For example, the helical valleys are arranged in such a manner that the helical element has a fluidic connection, in particular flow channel, between the mutually opposing ends, in particular front ends, of the helical element.

FIG. 1 shows a vibration damper 10, wherein the vibration damper 10 is a multi-tube vibration damper, for example, a two-tube vibration damper. The vibration damper 10 has an external tube 12 which forms an external face, in particular a housing, of the vibration damper 10. Inside the external tube 12, an internal tube 14 is arranged coaxially relative thereto. A compensation chamber 16, which is preferably at least partially filled with a hydraulic fluid, is formed between the external tube 12 and the internal tube 14. Preferably, the compensation chamber 16 is partially filled with a gas.

A working piston 18 which is connected to a piston rod 20 is arranged inside the internal tube 14 in such a manner that it can be moved inside the internal tube 14, wherein the internal tube is preferably in the form of a guide of the working piston 18. The working piston 18 preferably has a valve device. The working piston 18 divides the internal space of the internal tube 14 into a first working chamber 22 which is arranged at the piston rod side and a second working chamber 24 which is arranged remote from the piston rod. A central tube 26 is arranged inside the compensation chamber 16 coaxially relative to and between the internal tube 14 and the external tube 12.

The internal space of the external tube 12 is sealed in technical fluid terms at the piston rod side by means of a closure assembly 34. Opposite the closure assembly 34, at the end remote from the piston rod, the internal space of the external tube 12 is sealed in technical fluid terms by means of a base piece 36. For example, a base valve 38 which is attached in particular to the end of the internal tube 14 remote from the piston rod is arranged on the base piece 36. The base valve 38 is preferably a non-return valve which can be flowed through in both directions or only in one direction. The second working chamber 24 is preferably connected in technical fluid terms to the compensation chamber 16 via the base valve 38. The end of the internal tube 14 at the piston rod side is preferably fixed to the closure assembly 34.

The central tube 26 preferably comprises a tube element 28 and a helical element 30. The tubular element 28 and the helical element 30 are, for example, separate components which are connected to each other. The central tube 26 has, for example, a length which corresponds approximately to from 50 to 80% of the length of the internal tube 14. The central tube 26 is particularly attached to the internal tube 14 via a first and a second central tube attachment 40, 42. The first central tube attachment 40 is arranged at the end of the central tube 26 remote from the piston rod and the second central tube attachment 42 is arranged at the end of the central tube 26 at the piston rod side. Preferably, the tubular element 28 of the central tube 28 is directly attached to the internal tube 14, wherein the helical element 30 of the central tube 26 is, for example, not directly fixed to the internal tube 14. The central tube attachment 40, 42 preferably comprises two radially inwardly, circumferentially extending contractions 44*a,b*, wherein in the region of the contractions 44*a,b* the diameter of the central tube 26, in particular of the tubular element 28, is reduced so that the central tube 26, in particular the tubular element 28, lies against the internal tube 14. The axially inward, first contraction 44*a* is adjoined by an in particular annular expansion 46 of the internal tube 14, wherein in the region of the expansion 46 the diameter of the central tube 26, in particular of the tubular element 28, is increased to the previous diameter outside the contraction 44. The expansion 46 is adjoined in an axial direction outwardly by the second contraction 44*b* and forms the end of the tubular element 28. With the exception of the central tube attachment 40, 42, the central tube 26 preferably has a constant diameter and cross section. The expansion 46 is preferably constructed in such a manner that it forms a closed annular space 48 between the central tube 26 and the internal tube 14. For example, a sealing element, in particular a sealing ring 50, which lies against the internal tube 14 and the central tube 26 and which forms a fluid-tight seal between them, is arranged inside the annular space 48. Preferably, the first and second central tube attachments 40, 42 each have an annular space 48 with a sealing ring 50. The expansion 46 and contractions 44*a,b* are preferably formed in the tubular element 28 of the central tube 26.

An annular space 13 is formed between the central tube and the internal tube 14. At least one through-opening 17 which connects the first working chamber 22 to the annular space 13 in technical fluid terms is formed in the internal tube 14. The through-opening 17 is formed in the first operating chamber 22.

The tubular element 28 of the central tube 26 is preferably made from a metal. By way of example, the tubular element 28 has a flange region 52 for attaching a damping valve device 54 to the central tube 26. The flange region 52 is, for example, constructed integrally with the tubular element 28 and preferably has a circular cross section. The preferably tubular flange region 52 extends outwards in a radial direction from the central tube 26, in particular the tubular element 28, in the direction of the external tube 12. The flange region 52 forms a receiving member for the damping valve device 54, in particular the flange region 52 forms a fluid inlet and/or fluid outlet of the damping valve device 54. The flange region 52 connects the annular space 13 to the damping valve device 54. The external tube 12 preferably has an opening which is aligned with the flange region 52 for receiving the damping valve device 54 so that the damping valve device 54 is connected to the compensation chamber 16 in technical fluid terms.

The helical element 30 of the central tube 26 is preferably made from a plastics material. Preferably, the helical element has a tubular base member which is arranged coaxially relative to the tubular element 28 and which lies against the external face of the tubular element 28 with the internal face thereof. At least one radially outwardly directed projection is formed on the tubular base member of the helical element 30. Preferably, the projection is constructed so as to extend circumferentially around the tubular base member and extends in particular in the form of one or more helical windings around the tubular base member. By way of example, the helical projection extends from the tubular base member as far as the internal face of the external tube 12. It is also conceivable for the helical projection to be spaced apart from the internal face of the external tube 12.

The helical element 30 is connected to the tubular element 28 of the central tube 26, by way of example via a locking device 32. The locking device 32 is preferably constructed in such a manner that it prevents a relative movement of the tubular element 28 and the helical element 30 in an axial and/or circumferential direction. The locking device 32 is preferably constructed at the end of the central tube 26 at the piston rod side, in particular at the central tube attachment 42 which is at the piston rod side. The locking device 32 is preferably a positive-locking connection which is explained with reference to FIGS. 3*a* to 3*c*. Preferably, the locking device 32 is a snap-fit closure. The helical element 30 preferably extends from the locking device 32 as far as the flange region 52. Preferably, the helical element 30 is spaced apart in an axial direction from the flange region 52 and in particular does not extend in an axial direction beyond the flange region 52.

Figure 2:
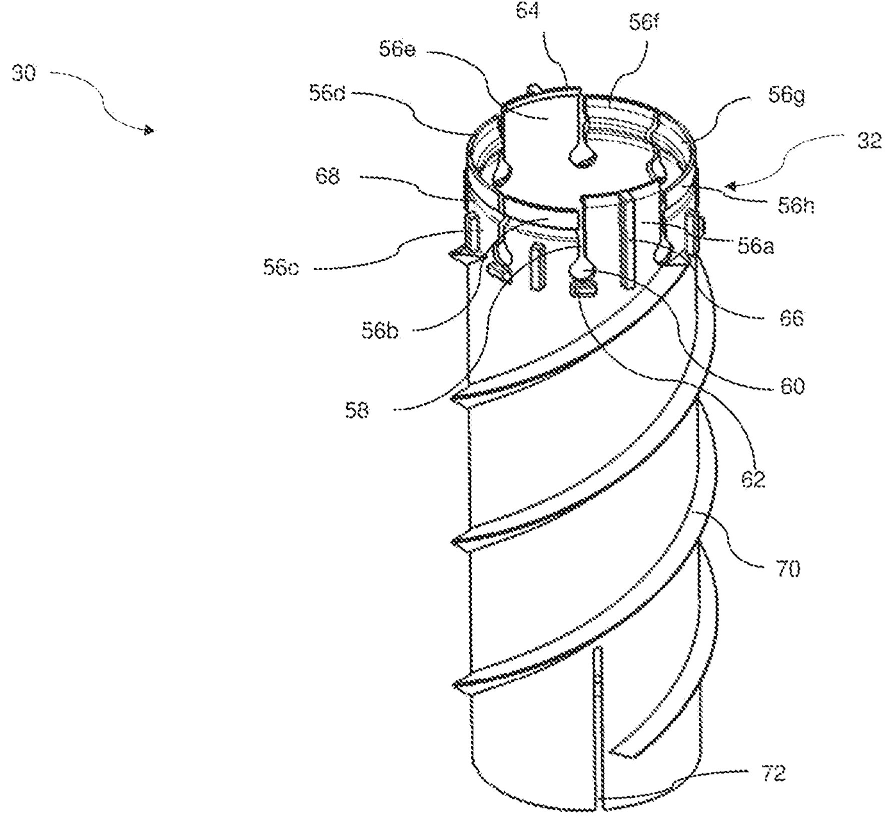
FIG. 2 shows a schematic perspective view of a helical element according to the disclosure.

FIG. 2 shows the helical element 30 for attaching to the tubular element 28. The helical element has by way of example the locking device 32. Preferably, the end region, which is directed in the direction of the closure assembly 34, of the helical element 30 is in the form of a locking device 32. The locking device 32 is preferably constructed in such a manner that it forms a positive-locking connection with the central tube attachment 42. Preferably, the locking device 32 is constructed in such a manner that it locks on the central tube attachment 42 and fixes the helical element 30 preferably in an axial direction on the tubular element 28.

The locking device 32 preferably comprises a plurality of clamping arms 56*a-h* which are arranged circumferentially beside each other and which form the end, which is directed in the direction of the closure assembly 34, of the helical element 30. The clamping arms 56*a-h* extend in an axial direction parallel with each other and are preferably separated via a slot 58, which extends in an axial direction, with respect to a clamping arm 56*a-h* which is adjacent in the circumferential direction. The helical element 30 preferably has a plurality of axial slots 58 which extend from the end, which is directed in the direction of the closure assembly 34, of the helical element 30 in an axial direction. For example, the slots 58 extend only in an axial direction and do not extend in a circumferential direction. The slots 58 open, by way of example, in a respective hole 60. The hole 60 is preferably adjoined in an axial direction by a reinforcement projection 62. The holes 60 are arranged, for example, at the same height.

By way of example, the helical element 30 has eight clamping arms 56*a-h*. In particular, the clamping arms 56*a-h* which are opposite each other at 180° are constructed identically.

Preferably, the locking device 32 has at least two different clamping arm geometries. The locking device 32 preferably has a first clamping arm 56*a,e* with a first clamping arm geometry and a second clamping arm 56*b,c,d,f,g,h* with a second clamping arm geometry. By way of example, the locking device 32 comprises two first clamping arms 56*a,e* with the first clamping arm geometry and six second clamping arms 56*b,c,d,f,g,h* with the second clamping arm geometry. The clamping arms 56*a-h* are particularly circumferential tube end portions of the helical element 30.

The first clamping arm 56*a,e* preferably extends in an axial direction in the direction of the end of the helical element 30 at the closure assembly side beyond the second clamping arm 56*b,c,d,f,g,h*. The first clamping arm 56*a,e* has in particular a radially inwardly directed first projection 64 which is preferably in the form of a partial ring and which particularly extends in a circumferential direction over the entire width of the first clamping arm 56*a,e*. The projection 64 particularly forms the axial end of the first clamping arm 56*a,e*. Preferably, the first clamping arm 56*a,h* is constructed in such a manner that it cooperates with the expansion 46, which forms the annular space 48, of the central tube attachment 42 and in particular forms a positive-locking connection. In particular, the projection 64 lies against the second contraction 44*b*.

The first clamping arm 56*a,e* preferably has a reinforcement 66, which is in the form of a radial projection and which extends in an axial direction. The reinforcement 66 extends, for example, centrally over the entire axial length of the first clamping arm 44*a,e*.

The second clamping arm 56*b,c,d,f,g,h* has in particular a radially inwardly directed second projection 68 which is preferably in the form of a partial ring and which particularly extends in a circumferential direction over the entire width of the second clamping arm 56*b,c,d,f,g,h*. The projection 68 is particularly arranged so as to be axially offset relative to the end of the second clamping arm 56*b,c,d,f,g,h*. Preferably, the second clamping arm 56*b,c,d,f,g,h* is constructed in such a manner that it cooperates with the first contraction 44*a* of the central tube attachment 42 and in particular forms a positive-locking connection. In particular, the projection 68 lies against the first contraction 44*a*.

At the end, opposite the locking device 32, of the helical element 30, for example, at least one axial recess 72 which is of slot-like form and which extends in an axial direction from the helical element end is provided. By way of example, the recess 72 extends over approximately from 10 to 20%, in particular from 15 to 25% of the length of the helical element 30. For example, the helical element 30 has a plurality of parallel recesses which are arranged at the end, which is opposite the locking device 32, of the helical element 30 and which are, for example, uniformly spaced apart from each other.

Figures 3A, 3B, 3C:
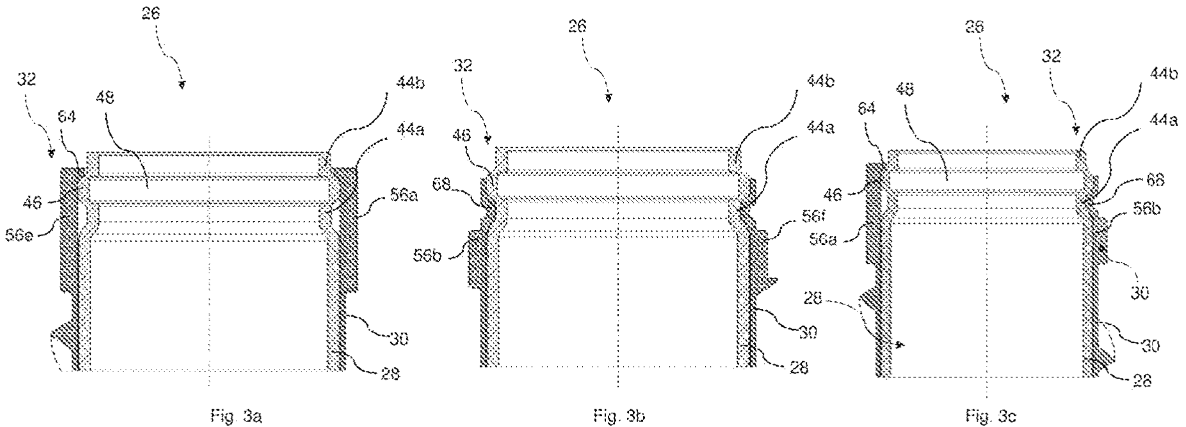
FIGS. 3*a-c* show a schematic sectional view of the end region of a central tube as a according the disclosure.

FIGS. 3*a-c* show three sectioned views of the central tube 26 in the region of the locking device 32. FIGS. 3*a* and *b* each show a longitudinal sectional view of the helical element 30 of FIG. 2 at a tubular element 28. FIG. 3*c* shows an additional embodiment of the helical element 30, in particular the locking device 32, wherein a first clamping arm 56*a* and a second clamping arm 56*b* are opposite each other at 180°.

LIST OF REFERENCE NUMERALS

10 Vibration damper
12 External tube
13 Annular space
14 Internal tube
16 Compensation chamber
17 Through-opening
18 Working piston
20 Piston rod
22 First working chamber at piston rod side
24 Second working chamber remote from piston rod
26 Central tube
28 Tubular element of the central tube
30 Helical element of the central tube
32 Locking device
34 Closure assembly
36 Base piece
38 Base valve
40 Central tube attachment
42 Central tube attachment
44*a,b* Contraction
46 Expansion
48 Annular space
50 Sealing ring
52 Flange region
54 Damping valve device
56*a-h* Clamping arms
58 Slots
60 Holes
62 Reinforcement projection
64 First projection
66 Reinforcement
68 Second projection
70 Helical windings
72 Recess

What is claimed is:

1. A vibration damper for a vehicle comprising:
an external tube and an internal tube arranged coaxially relative thereto, wherein a compensation chamber configured for receiving hydraulic fluid is between the external tube and the internal tube;
a working piston connected to a piston rod and arranged so as to be movable inside the internal tube, wherein the internal space of the internal tube is divided by the working piston into a first working chamber and a second working chamber; and
a central tube arranged inside the compensation chamber and attached to the internal tube, wherein the central tube includes a tubular element and a helical element, wherein the tubular element and the helical element are two distinct, non-integrally formed components connected to one another by a locking device.

2. The vibration damper of claim 1, wherein the locking device is in the form of a positive-locking connection.

3. The vibration damper of claim 1, wherein the locking device is within the helical element.

4. The vibration damper of claim 1, wherein the locking device affixes the helical element in an axial direction on the tubular element.

5. The vibration damper of claim 1, wherein the locking device includes a plurality of clamping arms arranged circumferentially and form an end of the helical element.

6. The vibration damper of claim 5, wherein the plurality of clamping arms extend in an axial direction and are spaced apart from a clamping arm which is adjacent in a circumferential direction by means of a slot.

7. The vibration damper of claim 1, wherein the locking device includes a first clamping arm with a first clamping arm geometry and a second clamping arm with a second clamping arm geometry.

8. The vibration damper of claim 1, wherein the central tube is attached to the internal tube via a central tube attachment.

9. The vibration damper of claim 8, wherein the locking device is attached to the central tube attachment.

10. The vibration damper of claim 8, wherein the locking device locks on the central tube attachment.

11. The vibration damper of claim 8, wherein the central tube attachment includes two radially inwardly directed, circumferentially extending contractions within the tubular element.

12. The vibration damper of claim 11, wherein a first clamping arm cooperates with a contraction and a second clamping arm cooperates with an additional contraction of the central tube attachment.

13. The vibration damper of claim 1, wherein the vibration damper includes a damping valve device and the tubular element includes a flange region for attaching the damping valve device to the central tube.

14. The vibration damper of claim 1, wherein the helical element of the central tube is made from a plastics material and/or the tubular element of the central tube is made from a metal.

15. The vibration damper of claim 1, wherein the helical element includes one or more circumferential helical windings which extend outwardly in a radial direction.

16. The vibration damper of claim 1, wherein the locking device is a snap-fit connection.

* * * * *